(12) United States Patent
Mack et al.

(10) Patent No.: US 9,061,639 B2
(45) Date of Patent: Jun. 23, 2015

(54) DEVICE AND METHOD FOR TRIGGERING PASSENGER PROTECTION DEVICES

(75) Inventors: Frank Mack, Seoul (KR); Gunther Lang, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 864 days.

(21) Appl. No.: 12/308,535

(22) PCT Filed: Aug. 2, 2007

(86) PCT No.: PCT/EP2007/057995
§ 371 (c)(1),
(2), (4) Date: Sep. 15, 2010

(87) PCT Pub. No.: WO2008/034671
PCT Pub. Date: Mar. 27, 2008

(65) Prior Publication Data
US 2011/0015829 A1    Jan. 20, 2011

(30) Foreign Application Priority Data
Sep. 21, 2006   (DE) .......................... 10 2006 044 444

(51) Int. Cl.
*B60R 21/00*     (2006.01)
*B60R 21/01*     (2006.01)
*B60R 21/0132*   (2006.01)

(52) U.S. Cl.
CPC ... *B60R 21/0132* (2013.01); *B60R 2021/01129* (2013.01)

(58) Field of Classification Search
CPC ................. B60R 21/0132; B60R 2021/01129

USPC ........ 280/735, 764.1; 180/273; 212/296, 203; 182/69.4; 248/179.1; 348/148; 49/142, 49/356, 68; 52/118; 701/45; 43/113, 114; 340/425.5, 435, 436, 940; 703/9; 600/23; 704/232; 706/38; 73/648
See application file for complete search history.

(56) References Cited

U.S. PATENT DOCUMENTS 2,839,149 A  *  6/1958  Piety ............................... 367/64
3,211,832 A  *  10/1965  Putzrath ........................... 703/9
(Continued)

FOREIGN PATENT DOCUMENTS

DE          19718803 C1  *  10/1998
DE          10256952 A1  *  6/2004
(Continued)

OTHER PUBLICATIONS

"Airbag triggering in a numerical vehicle fleet"; Airbag triggering in a numerical vehicle fleet.pdf; http://www.mate.tue.nl/mate/pdfs/3964.pdf; retrieved: Sep. 23, 2013.*
(Continued)

*Primary Examiner* — Mussa A Shaawat
*Assistant Examiner* — James E Stroud
(74) *Attorney, Agent, or Firm* — Kenyon & Kenyon LLP (57) ABSTRACT

A device and a method for triggering passenger protection devices, an accident sensor system generating a first signal and the passenger protection devices being triggered as a function of a frequency of a second signal, which is derived from the first signal, the frequency being determined as a function of a first length of a first signal characteristic of the second signal and of a second length of a second signal characteristic of the added-up second signal.

25 Claims, 8 Drawing Sheets

(56) References Cited

U.S. PATENT DOCUMENTS

| | | | | |
|---|---|---|---|---|
| 3,440,617 A * | 4/1969 | Lesti | ............................... | 382/224 |
| 3,455,149 A * | 7/1969 | Ostrander et al. | ............... | 73/658 |
| 4,815,757 A * | 3/1989 | Hamilton | ................... | 280/764.1 |
| 5,583,771 A * | 12/1996 | Lynch et al. | ..................... | 701/36 |
| 6,175,787 B1 * | 1/2001 | Breed | ......................... | 701/29.2 |
| 6,533,316 B2 * | 3/2003 | Breed et al. | ................... | 280/735 |
| 7,096,621 B2 * | 8/2006 | Nelson et al. | ................... | 43/113 |
| 7,671,723 B2 * | 3/2010 | Theisen | ..................... | 340/425.5 |
| 2004/0036261 A1 * | 2/2004 | Breed | ............................ | 280/735 |
| 2004/0129478 A1 * | 7/2004 | Breed et al. | ................... | 180/273 |

FOREIGN PATENT DOCUMENTS

| | | | |
|---|---|---|---|
| DE | 10 2004 042467 | | 3/2006 |
| GB | 2356076 | | 5/2001 |
| GB | 2356076 A * | | 5/2001 |
| GB | 2376118 | | 12/2002 |
| GB | 2376118 A * | | 12/2002 |
| JP | 2004-505849 | | 2/2004 |
| JP | 2005-106664 | | 4/2005 |
| JP | 2005-289376 | | 10/2005 |
| JP | 2006-192968 | | 7/2006 |
| JP | 2011-42366 | | 3/2011 |
| WO | WO 9718108 A1 * | | 5/1997 |
| WO | WO 0134438 A1 * | | 5/2001 |

OTHER PUBLICATIONS

"Efficient quadrature of highly oscillatory integrals using derivatives"; Efficient quadrature of highly oscillatory integrals using derivatives,pdf; rspa.royalsocietypublishing.org retrieved: Sep. 12, 2013.*

"The Fatigue Approach to Vibration and Health"; The Fatigue Approach to Vibration and Health.pdf; http://www.sciencedirect.com/science/article/pii/S0022460X98916054; retrieved: Sep. 23, 2013.*

"A Comparison of Standard Methods for predicting the hazards of Whole-Body Vibration and Related Shocks"; A Comparison of Standard Methods for predicting the hazards of Whole-Body Vibration and Related Shocks.pdf; http://www.sciencedirect.com/science/article/pii/S0022460X98916005; retrieved: Sep. 23, 2013.*

"Predicting the Total Fatigue Life in Metals"; Predicting the Total Fatigue Life in Metals.pdf; http://www.sciencedirect.com/science/article/pii/S0142112308002879#; retrieved: Sep. 23, 2013.*

"Signals and Systems-A Fresh Look"; Signals and Systems-A Fresh Look.pdf; http://www.ece.sunysb.edu/~ctchen/media/freshlook.pdf; retrieved: Sep. 24, 2013.*

"Proposed Examiner_s Amendment"; authored by Aaron Grunberger, Kenyon & Kenyon LLP; recieved Feb. 17, 2015.*

International Search Report, PCT International Patent Application No. PCT/EP2007/057995, dated Feb. 4, 2008.

* cited by examiner

DEVICE AND METHOD FOR TRIGGERING PASSENGER PROTECTION DEVICES

FIELD OF THE INVENTION

The present invention relates to a device and a method for triggering a passenger protection device.

BACKGROUND INFORMATION

German Patent Application No. DE 102 004 042 467 A1 describes a method and a device for generating a deployment signal for a pedestrian protection device. In this method, a deployment check and a plausibility check of the sensor data are performed, an extraction of features and/or an offset recognition being performed in the deployment check to recognize a pedestrian using the sensor data, thus determining a point of impact of the object, the deployment signal for the pedestrian protection device being generated when a collision with a pedestrian is recognized in the deployment check and the plausibility check of the sensor data is positive.

SUMMARY

The example device and method according to the present invention for triggering a passenger protection device may have the advantage that by determining a frequency of a signal derived from the accident signal, a very accurate and robust differentiation between a pedestrian impact and other objects is possible. This is due to the fact that different objects have a different stiffness and therefore result in a different excitation frequency. According to the present invention, the frequency is determined by the length of a signal characteristic, the added-up signal characteristic, i.e., the integrated signal characteristic, also being used. Better protection of pedestrians is then possible when this is used with a pedestrian protection system.

In the present case, the second signal may be the first signal, a filtered first signal, an averaged first signal or an integrated, i.e., added-up, first signal.

If the example device and method according to the present invention are used for other types of impact, e.g., between vehicles, a better differentiation between a deployment case and a nondeployment case is possible according to the present invention. In particular, misuse objects may be identified better through the analysis of frequency according to the present invention. A higher safety potential is thus achieved and the risk of unintentional faulty deployment is reduced.

Figure 4:
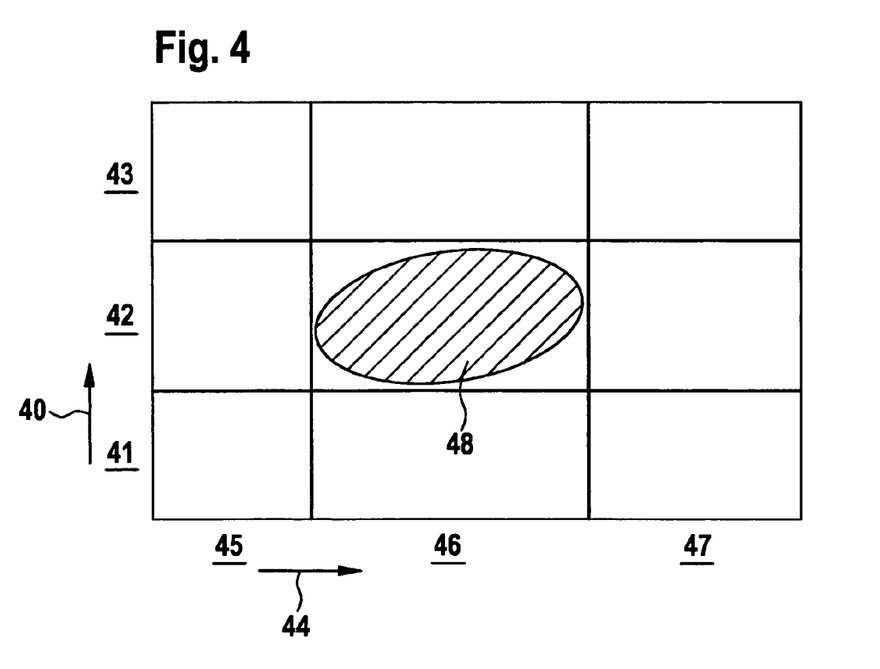
FIG. 4 shows a stiffness-weight diagram.

With regard to pedestrian protection, it should be noted that people differ from a great many objects for which deployment of pedestrian protection devices is not desired mainly through their mass and hardness, i.e., their stiffness. This is illustrated in FIG. 4, in which weight is plotted on the abscissa and stiffness on the ordinate. Three classes are identified here, a weight differentiation being made between light 45, medium 46 and heavy 47. The stiffness is classified as soft 41, medium 42 or hard 43. Humans, ranging from a 6-year-old child to an adult, move in field 48. For example, a ball is shown in the lower left field, with cats, birds, and posts assumed to be above this and a golf ball in the top field. For the medium weight, a large steel post or a trash can is to be assumed above the field for humans. For heavy weight, a wall or another vehicle is to be assumed when there is a hard stiffness. If the stiffness of the impact object is now classified based on the frequency of the vibration that occurs with a collision, this object is able to be identified. The frequency is preferably detected by an acceleration sensor or by multiple acceleration sensors or by knock sensors. The intrinsic frequency of the vibration in a simple spring model is proportional to the root of the spring constant. Hard objects thus result in high-frequency signals, whereas soft objects result in low-frequency signals.

Deployment crashes often differ from nondeployment crashes and misuse objects in the frequency characteristic of the acceleration signals. The frequency characteristic of the acceleration signals is determined by the sequence of breakage processes in the impact zone. Nondeployment crashes usually have lower-frequency acceleration signals than deployment crashes because of the lower crash speed and therefore the slow breakage processes. Misuse objects often have frequency characteristics that differ significantly from crash signals.

First of all, they may have a lower frequency than crash signals, e.g., a pile of gravel, but they may also have a higher frequency, e.g., hammer blows. The goal is to detect these frequency differences in the acceleration signal. The acceleration sensor which detects acceleration in the longitudinal direction of the vehicle, e.g., in a centrally situated airbag control unit, is therefore most suitable for front crashes. However, it is also possible for the frequencies of a transverse acceleration sensor or the so-called upfront sensors to be analyzed. The upfront sensors are installed in the front of the vehicle. The resulting frequency information may then be used to influence the main algorithm, which continues to operate on the basis of acceleration signals and their first and second integral by adapting the deployment thresholds. The intervention in the main algorithm may in principle take place in the same way as with other additional algorithms, e.g., the upfront algorithm influences the main algorithm.

For a side crash, the frequency analysis is most suitably performed on the basis of the peripheral transverse acceleration sensors. The peripheral transverse acceleration sensors are installed in the side of the vehicle. The resulting information may be used to influence the main algorithm by adapting the deployment threshold. To do so, generally the example method of frequency determination according to the present invention is used.

The example method described here involves performing a frequency analysis based on measurement of the length of the signal as well as the integrated signal, the signal itself optionally also being modified by signal processing.

It may be advantageous in particular if the length of the signal characteristic is determined by using a difference between successive values of the signal and of the added-up signal. These differences may preferably be added up as absolute values to determine the length of the signal. The length of the signal or of the signal characteristic is a measure of the movement in the signal. Accordingly the length, e.g., of the first integral, is a measure of the movement in the first integral. High-frequency vibrations are characterized in that they build up relatively little integral, i.e., a given movement results in relatively little movement in the integral. The signal is therefore compared with the added-up or integrated signal. The term "added up" is thus understood to refer to a computational option of integration. It is therefore self-evident to use the ratio of the lengths. This yields an improved frequency estimate.

The quotient between the length of the signal and the length of the added-up signal is preferably used for this. The distance between the values of a signal to form the differences is determined by the cycling of the algorithm. This is independent of whether the vibration begins with a positive or negative half-wave. The plus or minus sign is not taken into account.

The frequency determination may be performed continuously, i.e., it may begin again at the start of the algorithm or at certain intervals.

If more than one accident sensor is used, e.g., more than one acceleration sensor or a structure-borne noise or a knock sensor, the analyzer circuit, usually the microcontroller, weights the frequencies which are ascertained for the individual accident sensors and then averages these weighted values.

The weighting is advantageously performed as a function of the length of the added-up second signal. The weighting is performed according to the length of the first integral of the signal or the added-up signal. This means that the sensor having the greatest length of the first integral is weighted the most. This ensures that the closest sensor in a pedestrian impact, which will typically see the strongest signal, also enters into the frequency estimate to a greater extent than the other sensors.

As indicated above, the accident sensor system may also be designed as an acceleration sensor system but other sensors may additionally be present. In addition to acceleration sensors, rotational rate sensors, knock sensors or structure-borne noise sensors may also be used.

Exemplary embodiments of the present invention are depicted in the figures and are explained in greater detail below.

DETAILED DESCRIPTION OF EXAMPLE EMBODIMENTS

Figure 5:
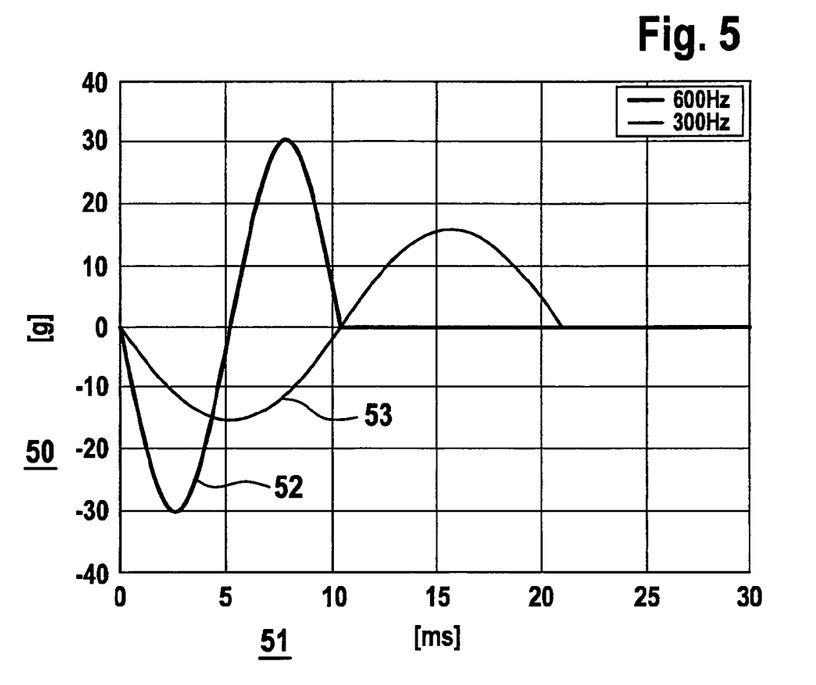
FIG. 5 shows a signal characteristic for a sinusoidal acceleration having angular frequencies of 600 Hz and/or 300 Hz.
Figure 6:
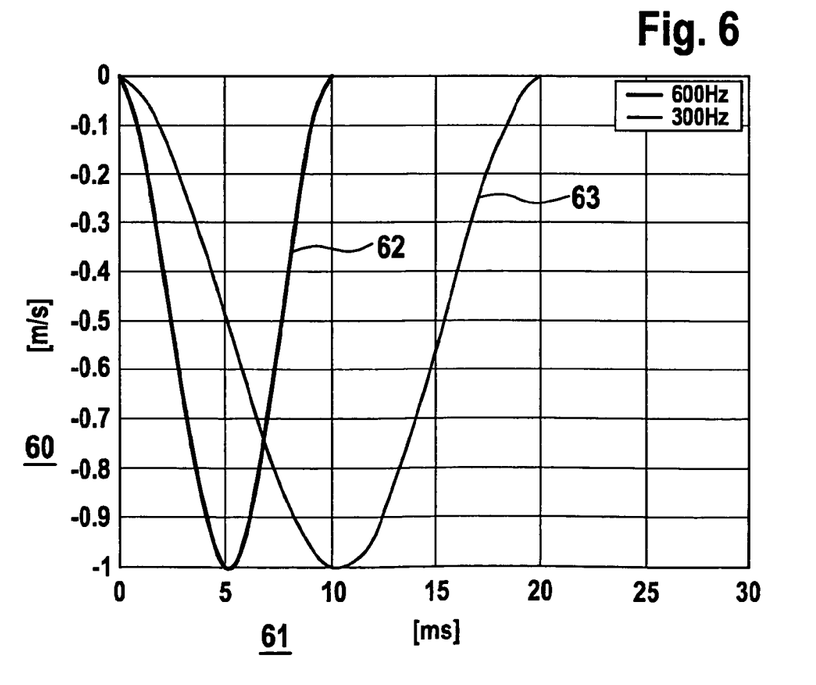
FIG. 6 shows a corresponding diagram for the integral of this sinusoidal acceleration.
Figure 7:
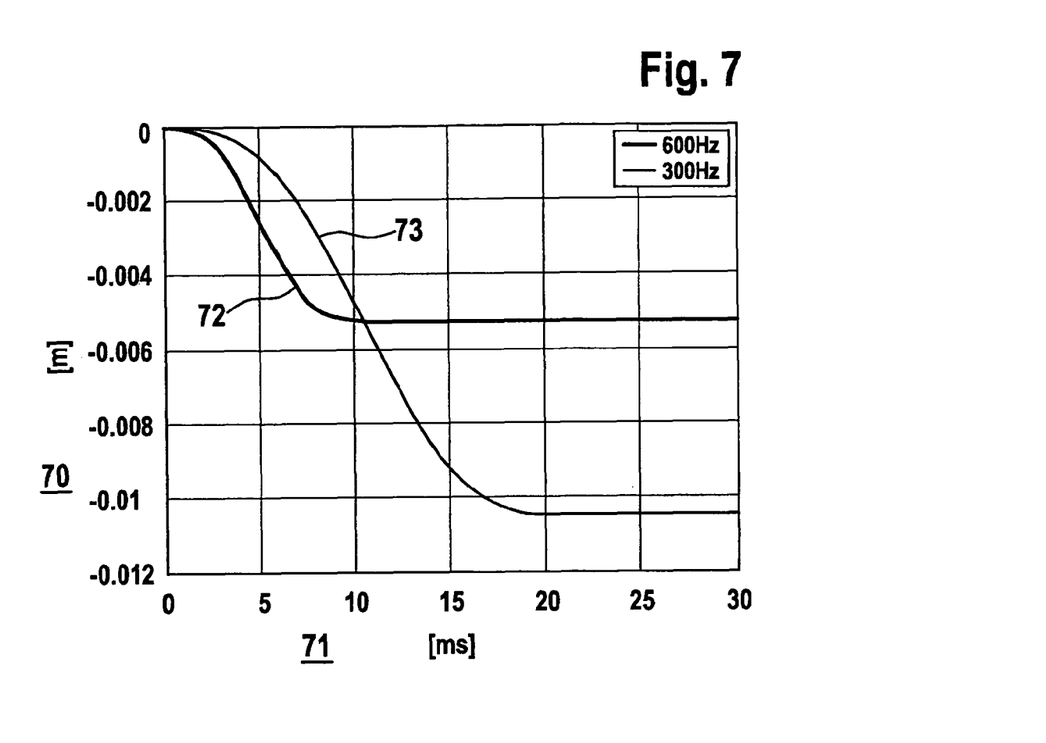
FIG. 7 shows the corresponding second integral for this sinusoidal acceleration.

To identify collision objects, frequency analysis is a great advantage for pedestrian protection as well as for other types of collisions. It is possible here to determine the frequency via the minimums of the acceleration signal and via the first integral and also via the second integral. This is apparent from FIG. 5, for example. FIG. 5 shows the time on abscissa 51 and the acceleration on ordinate 50. Two signals 52 and 53 are shown in the time characteristic. Signal 52 has an angular frequency of 600 Hz, and signal 53 has an angular frequency of 300 Hz. FIG. 6 shows the integrals for this. Signal 62 is the signal having angular frequency 600 Hz and signal 63 is the signal having angular frequency 300 Hz. According to FIG. 7, signal 72 is the signal having angular frequency 600 Hz and signal 73 is the signal having angular frequency 300 Hz. The frequency may then be reconstructed in two ways:

1. The frequency may be calculated from the minimum of the acceleration and the minimum of the first integral of the acceleration. The frequency is then obtained by division.

$$\omega = 2\frac{\overline{a}}{\overline{dv}} \qquad (1)$$

2. The frequency may be calculated from the minimum of the first integral and the minimum of the second integral. Here again, division may be used.

$$\omega = \pi\frac{\overline{dv}}{\overline{ds}} \qquad (2)$$

This example method has potential for improvement with regard to the following points:

A. If the signal does not end after one period as described above, but instead the vibration is maintained for a longer period of time, no new maximums are reached by the acceleration and the first integral. The first calculation procedure thus continues to yield a correct estimate of frequency. However, the second integral continues to decline constantly and reaches new minimum values. The second calculation procedure is therefore no longer valid and the estimated frequencies are increasingly too low.

Figure 8:
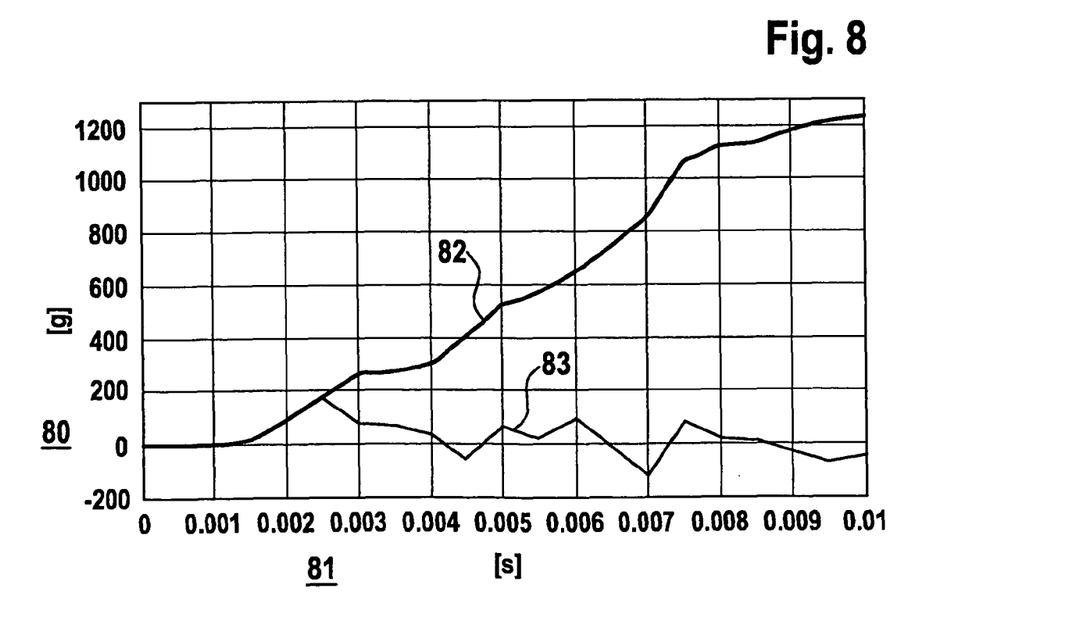
FIG. 8 shows an acceleration signal and the corresponding length of the acceleration signal.

B. Only the first half-wave, i.e., the first full period, is detected. The remaining course in a real signal, which is not usually harmonic, is detected only when new minimums of the signal or the first and second integral are associated with this. If that is not the case, the frequency estimate no longer changes even if the signal itself should change its frequency. Such an example is shown in FIG. 8, which shows a diagram in which time is plotted on abscissa 81 and acceleration is plotted on ordinate 80. Signal 83 characterizes the acceleration. Signal 82 characterizes the length of the acceleration signal. The differentiation as to whether it is necessary to calculate with minimums or maximums does not allow representation of a continuous transition from bumper areas having a negative acceleration to those having a positive acceleration, for example.

It is therefore proposed according to the present invention that one should consider the length of the signal and/or signal characteristic, not the minimums of the signal of the first and/or second integral. The difference in successive values may preferably be added up as absolute values.

This is represented by curve 82 in FIG. 8. The length of the signal of the first integral and that of the second integral are expressed as follows:

$$\text{length}(a) = \sum_i |a_i - a_{i-1}| \qquad (3a)$$

$$\text{length}(dv) = \sum_i |dv_i - dv_{i-1}| = \sum_i |a_i| \qquad (3b)$$

$$\text{length}(ds) = \sum_i |ds_i - ds_{i-1}| = \sum_i |v_i| \qquad (3c)$$

The present invention is explained in greater detail below on the basis of the acceleration signals. However, it is also possible to use other accident signals.

Equation (3b) makes use of the fact that the difference between two successive integrator values is equal to the acceleration value assigned to this cycle. Accordingly in equation (3c) the difference between two successive values of the second integral is equal to the value of the first integral in this cycle.

FIG. 8 shows the length of the acceleration signal. This shows that by the first signal maximum, the length of the signal follows the signal itself. The subsequent forward swing, however, is taken into account in the length without a plus or minus sign and results in a further increase. The length of the signal is thus a measure of the "movement in the signal." Accordingly, the length of the first integral is a measure of the "movement in the first integral," and high frequency vibrations are now characterized in that they build up relatively little integral, i.e., a given "movement in the signal" results in relatively little "movement in the integral."

Instead of the amplitude ratio (1), it is therefore advisable to use the ratio of the lengths. This yields as an improved frequency estimate $$\omega = \frac{\text{length}(a)}{\text{length}(dv)} = \frac{\sum_i |a_i - a_{i-1}|}{\sum_i |v_i - v_{i-1}|} = \frac{\sum_i |a_i - a_{i-1}|}{\sum_i |a_i|} \quad (4)$$

Index i runs over all computation cycles from the start of the algorithm. The frequency is thus obtained as the quotient of the length of the acceleration signal and the absolute integral of the acceleration signal.

As may be seen, equation (4) is independent of whether the vibration begins with a positive or negative half-wave (plus or minus sign of a).

During the first half-wave of sinusoidal vibration indicated above $0<t<\pi/\omega$, it holds that length($a$)=$2\bar{a}$ and length($v$)=$\bar{v}$ and thus the result of (1) is reproduced. The bar here stands for the minimum achieved in a and v, respectively.

Figure 9:
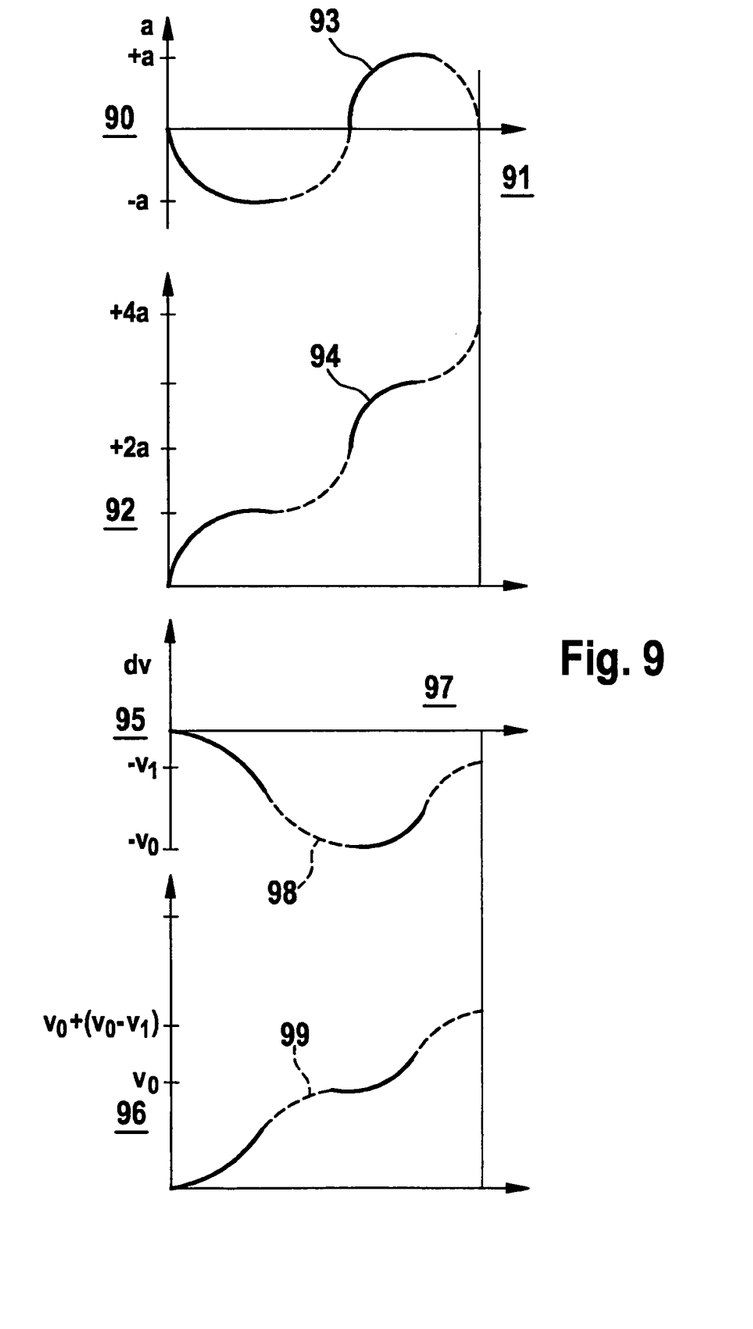
FIG. 9 shows the schematic diagram of a vibration, whose second half-wave has a higher frequency than the first half-wave.

Although second half-wave $\pi/\omega<t<2\pi/\omega$ no longer contributes to (1) because the minimums of signal and integral were achieved during the first half-wave and in the second half-wave only the reverse integration to v=0 takes place, the second half-wave does indeed contribute to (4). If the vibration remains harmonic, the following holds at the end of entire period length($a$)=$4\bar{a}$ and length($v$)=$2\bar{v}$, i.e., the ratio and thus the ascertained frequency do not change. However, if the vibration should change its frequency in the second half-wave, it is detected with method (4) in contrast to method (1) and results in an accordingly corrected frequency estimate. This is illustrated in FIG. 9. In this example, the second half-wave of the signal has the same amplitude as the first half-wave but it has a higher frequency. However, this is not applied to the length of the signal, and at the end of the period, length(a)=4a0. The higher frequency of the second half-wave, however, results in the integrator not being returned to zero but instead remaining at a negative value −v1. The second half-wave thus results in an integrator change from v0 to v1. The length of the integral is thus length(v)=2v0−v1<2v0 and is thus smaller than with harmonic continuation of the vibration. The quotient (4) thus supplies a higher frequency estimate than the quotient (1).

Figure 10:
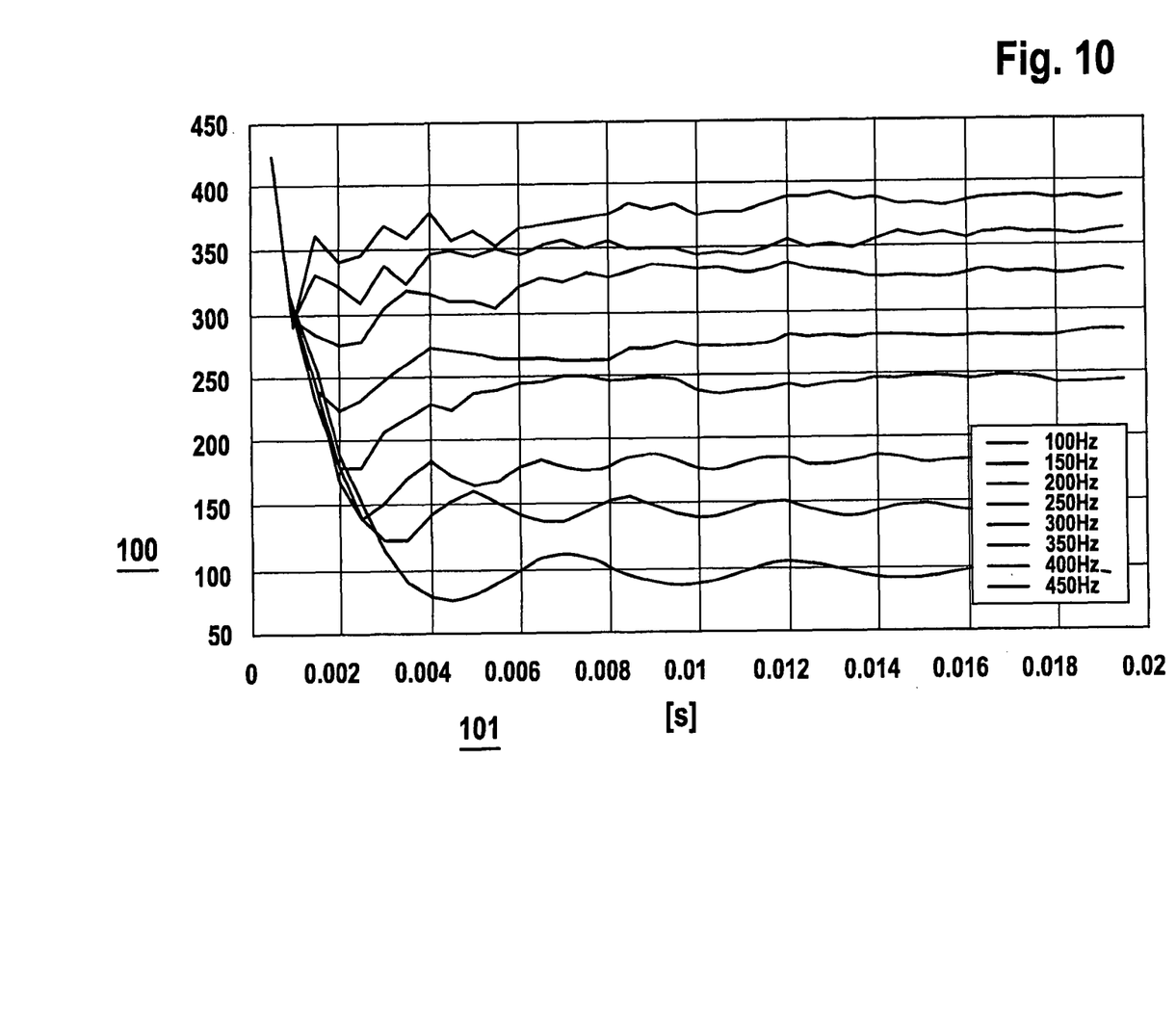
FIG. 10 shows a result of the frequency estimate for sine curves having different frequencies.

FIG. 10 shows the result of the frequency estimate (4) for harmonic vibrations with frequencies of 100-450 Hz. The deviations occurring between the ascertained frequencies and the exact frequencies are due to signal processing; in this example, the sensor is scanned at 4.4 kHz, but the analytical algorithm runs asynchronously in the 2 kHz grid. With correspondingly high synchronous signal scanning and processing, equation (4) would reproduce the exact frequencies.

Figure 11:
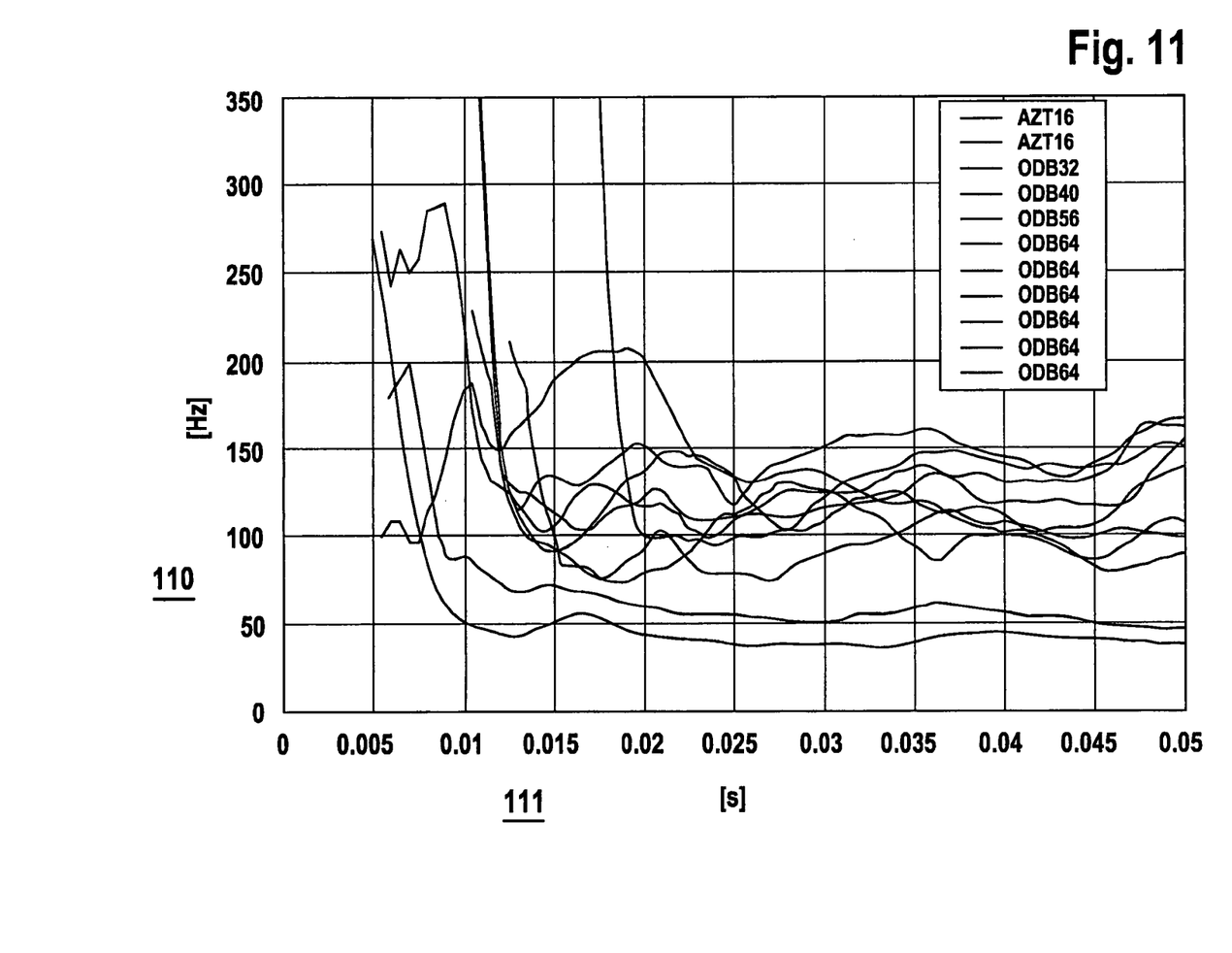
FIG. 11 shows a result of the frequency estimate for vehicle crashes.

FIG. 11 shows the frequency analysis for vehicle crashes of competing types AZT 16 km/h (nondeployment repair crash) versus crashes having a 40% offset against a deformable barrier (ODB with 32, 40 and 64 km/h) on the basis of central device x sensor. The different crash types are separable on the basis of their frequency content.

Using the same method, equation (2) is replaceable by $$\Omega = \frac{\pi \text{length}(dv)}{2\text{length}(ds)} = \frac{\pi \sum_i |v_i - v_{i-1}|}{2\sum_i |s_1 - s_{i-1}|} = \frac{\pi \sum_i |a_i|}{2 \cdot \sum_i |v_i|} \quad (5)$$

The frequency is thus obtained as the quotient of the absolute integral of the acceleration signal and the absolute integral of the first integral.

In contrast to equation (2), this frequency estimate yields correct results even when the vibration does not change after a period but instead is still maintained. Then although the second integral and its length continue to increase, this is compensated by the further increase in the length of the first integral in the numerator—the ratio and thus the frequency remain constant.

Both methods (4) and (5) represent a ratio of two variables. In the control unit code, it is now self-evident to print out a threshold query of the frequency thereby ascertained, e.g., omega=numerator/denominator<threshold in the form numerator<denominator*threshold. (6).

This avoids division, which is a time-intensive computation.

For use in the area of pedestrian protection, typically two or three acceleration sensors are used. The problem arises here of how the frequencies of the individual sensor signals are to be combined while taking into account their signal intensity. If possible, division should be avoided for the individual frequencies in (4) and (5).

These requirements are met as follows. The frequency estimate (4) applied to three independent sensors in this example (left, center, right) initially yields the three individual frequencies $$\omega_L = \frac{\text{length}(a_L)}{\text{length}(dv_L)}, \omega_R = \frac{\text{length}(a_R)}{\text{length}(dv_R)} \text{ and } \omega_M = \frac{\text{length}(a_M)}{\text{length}(dv_M)}.$$

A weighted averaging of these three individual frequencies is now to be performed by weighting the individual sensor signals according to the length of the first integral. This means that the sensor having the greatest length of the first integral is weighted the most. This ensures that the nearest sensor in a pedestrian impact, typically seeing the strongest signal, will also be applied to the frequency estimate with an accordingly greater weight than other sensors. Using weight factors $$f_i = \frac{\text{length}(dv_i)}{\sum_j \text{length}(dv_j)},$$

where indices i and j stand for the individual sensors, yields the total frequency as follows:

$$\omega = \sum_i f_i \cdot \omega_i = \sum_i \frac{\text{length}(dv_i)}{\sum_j \text{length}(dv_j)} \frac{\text{length}(a_i)}{\text{length}(dv_i)} = \frac{\sum_i \text{length}(a_i)}{\sum_i \text{length}(v_i)}. \quad (7)$$

In the numerator the length of the acceleration signals is added up over all sensors, while in the denominator the length of the first integrals (which are identical to the absolute integral of acceleration according to (3b)) are added up over all sensors. Since (7) is in turn a simple quotient, a threshold query may again be displayed in the form of (6) while avoiding division.

The frequency estimate (5) for the three individual sensors similarly yields the results $$\Omega_L = \frac{\pi \text{length}(dv_L)}{2\text{length}(ds_L)}, \Omega_R = \frac{\pi \text{length}(dv_R)}{2\text{length}(ds_R)} \text{ and } \Omega = \frac{\pi \text{length}(dv_M)}{2\text{length}(ds_M)}.$$

A weighted averaging is advantageously performed here in such a way that the individual sensors are weighted according to the length of their second integral. Using weighting factors $$g_i = \frac{\text{length}(ds_i)}{\sum_j \text{length}(ds_j)}$$

the total frequency is then obtained as $$\Omega = \sum_i g_i \Omega_i = \frac{\pi}{2} \frac{\text{length}(ds_i)}{\sum_j \text{length}(ds_j)} \frac{\text{length}(dv_i)}{\text{length}(ds_i)} = \frac{\pi}{2} \frac{\sum_i \text{length}(dv_i)}{\sum_i \text{length}(ds_i)} \quad (8)$$

A threshold query in the form of (6) may also be represented using this result.

Figure 12:
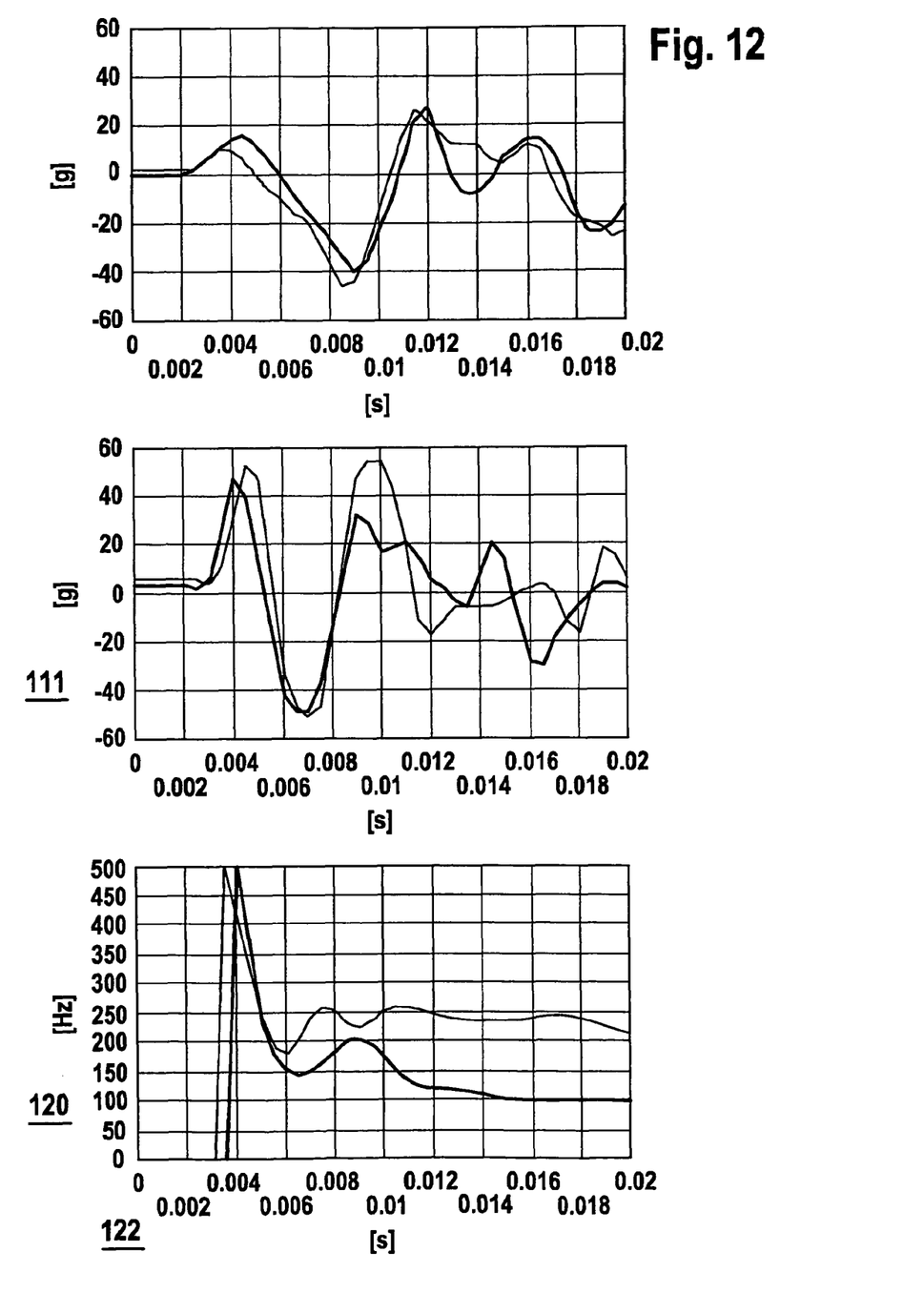
FIG. 12 shows acceleration signals for lower leg and steel posts of comparable mass and the vehicle speed and/or frequency analysis by the example method according to the present invention.

FIG. 12 shows the signals of a pedestrian's leg (lower leg impactor 13.4 kg) and a steel post of a comparable mass (12.2 kg) with a central impact against a vehicle bumper at a vehicle speed of 20 km/h. The combined frequency analysis of the two sensors on the basis of (8) allows a reliable separation of these objects after the $10^{th}$ ms.

For application in the area of pedestrian protection, it is most suitable to perform the threshold query (6) based on equations (4), (5), (7) or (8) using a threshold, which may be selected as a function of the CAN speed and/or the recognized point of impact and/or the prevailing ambient temperature.

The comparison of the form (6) may take place in a certain time window using a constant or time-dependent threshold.

Figure 1:
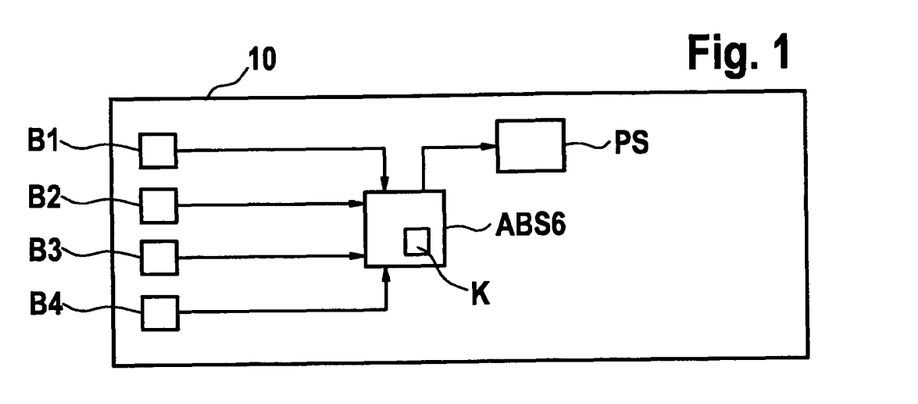
FIG. 1 shows a block diagram of an example device according to the present invention.

FIG. 1 shows a block diagram of the example device according to the present invention. For example, in a vehicle 10, four acceleration sensors B1 through B4 are situated on the front of the vehicle. Instead of four acceleration sensors, only two or three acceleration sensors or even only a single acceleration sensor may also be used. On the basis of an acceleration, acceleration sensors B1 through B4 generate a change in capacitance, e.g., of a micromechanical element, which is amplified and digitized in order to be transmitted to a control unit ABSG. This control unit ABSG is installed centrally in the vehicle but it may also be installed at other locations. Control unit ABSG controls all of the passenger protection devices of the vehicle, e.g., pedestrian protection and passenger protection. The internal design of control unit ABSG is not shown for the sake of simplicity. It is only shown that a structure-borne noise sensor K may be installed in airbag control unit ABSG. The analyzer circuit, e.g., as a microcontroller, is in airbag control unit ABSG as well as interface modules and other sensors triggering circuits for passenger protection devices PS.

Depending on the signals of acceleration sensors B1 through B4, airbag control unit ABSG performs the frequency analysis described above. On the basis thereof, an impact object may be identified to thereby decide whether or not passenger protection means PS should be triggered. Passenger protection devices PS include interior airbags, seat belt tighteners and pedestrian protection means, such as a raisable front hood and/or exterior airbags.

Figure 2A:
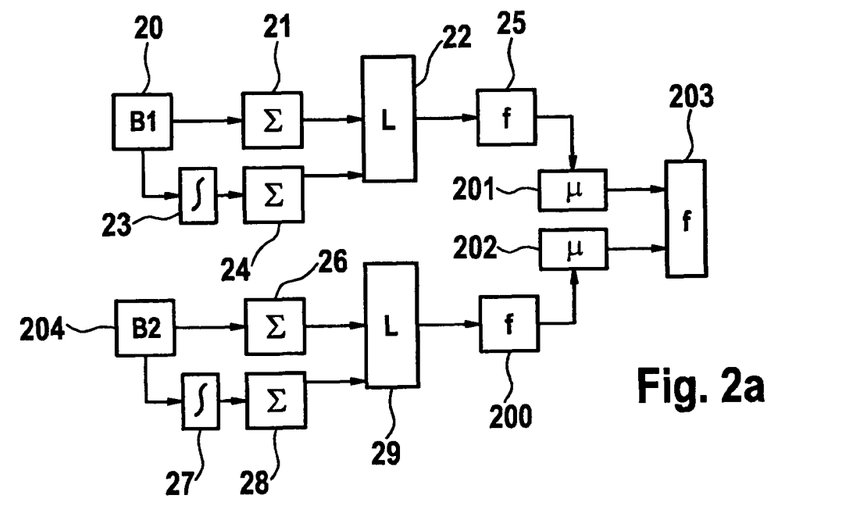
FIGS. 2a and 2b each show a signal characteristic diagram to illustrate the example method according to the present invention.

FIG. 2a illustrates the example method according to the present invention in a first signal characteristic diagram. However, only two acceleration sensors B1 and B2 are considered here as examples. Acceleration sensors B1 and B2 in block 20 and 204, respectively, deliver their signals. This signal of acceleration sensor B1 is then added up in absolute values in block 21 with respect to successive values and their differences. At the same time, the acceleration signal of sensor B1 is integrated in block 23, i.e., weighted averaging or other equivalent types of integration may also be performed. Here again, in block 24 the differences between successive values are added up in absolute values. In block 22, a quotient is then formed based on these signal lengths to determine the frequency in block 25. In block 201, as explained above, weighting for the frequency from block 24 may be ascertained from the values of the first integral. However, it is also possible for other weightings that are fixedly preset or performed adaptively to be performed. This weighted frequency goes to block 203, which performs averaging. The result is then the frequency.

In the lower half of the signal path, this also takes place in parallel for signal B2. Successive values are subtracted from one another and the differences are added up in absolute values in block 26. The signal of acceleration sensor B2 is integrated in block 27, and here again, the differences between successive values are then added up in block 28. In block 29, a quotient is then formed from these values to determine the frequency in block 200. Likewise, the weighting is formed from the values of the first integral as an example in block 29 as described above to make these values available in block 202. Here again, any other weighting is also possible to amplify or diminish the signals of the individual sensors in averaging for the frequency determination accordingly. The weighting of the frequency then results in the weighted frequency, which is also applied to averaging 203. The weighted average is then ascertained from this value. If there is only one sensor, the example method according to the present invention is already terminated in block 25, for example. Weighting and averaging are then no longer necessary. If more signals from more sensors are available, these signal paths are repeated.

Figure 2B:
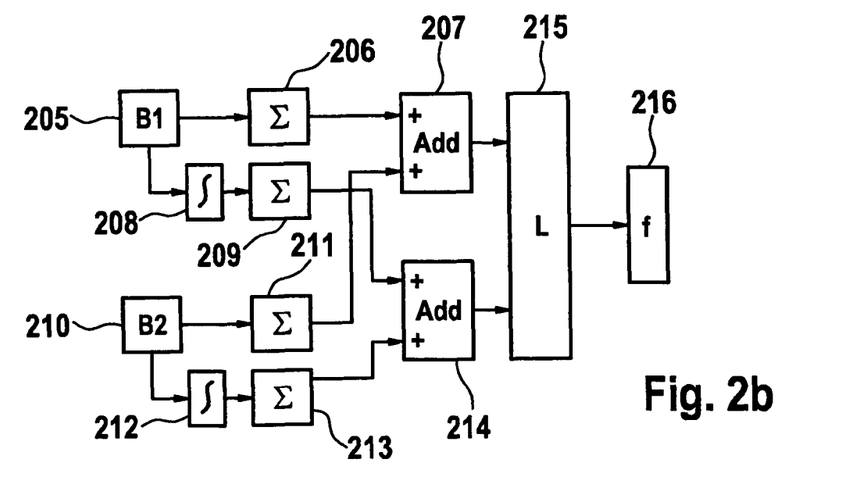

FIG. 2b illustrates an alternative signal characteristic. In block 205, the acceleration signal of sensor B1 is made available. This signal may already be low-pass filtered, for example. This signal is added up in absolute values in block 206 with respect to successive values and their differences. At the same time, the signal in block 208 is integrated and then added up in absolute values in block 209 with respect to successive values and their differences. In block 207 the sums of the accelerations that are added up in absolute values as described above are counted together, and in block 214 the sums of the integrated accelerations added up in absolute values as described above are counted together. It is thus possible according to equation (7) to form a quotient from these two sums in block 215 and then to determine the frequency in block 216. It is thus no longer necessary to form an individual quotient or to perform averaging.

Figure 3:
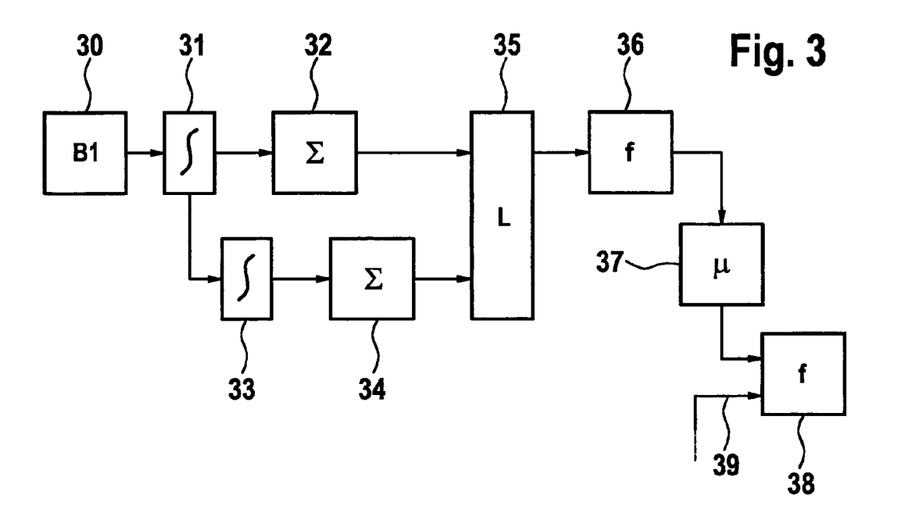
FIG. 3 shows another signal characteristic diagram.

FIG. 3 illustrates an alternative to the example method according to the present invention. In block 30, the signal of acceleration sensor B1 is available. This is integrated in block 31. In block 32, the differences in successive values are then added up in absolute values, and at the same time, the integrated acceleration signal is integrated again in block 33. Here again, successive values are then analyzed with regard to their differences and these differences are added up in absolute values in block 34. The length is determined from the added-up differences between blocks 32 and 34 and block 35 and the frequency is determined by forming a quotient in block 36. Likewise, the weighting is either supplied from available parameters or fixedly set values in block 37. The weighted frequency is then determined from this in block 38. This signal characteristic is then repeated over signals 39 for other sensors.

What is claimed is:

1. A device for triggering a passenger protection device of a vehicle, wherein the device is configured to be connected to an accident sensor system which is configured to generate a first signal in response to a single impact event in which an object impacts the vehicle, the device comprising:
an analyzer circuit adapted to:
derive a second signal from the first signal;
integrate the second signal to obtain a third signal;
determine a first value, which characterizes a combination of values of the second signal over an entirety of a period during which the second signal lasts, by an absolute summation of particular differences in successive values of the second signal;
determine a second value, which characterizes a combination of values of the third signal over an entirety of a period during which the third signal lasts, by an absolute summation of particular differences in successive values of the third signal;
determine a frequency of the second signal by forming a quotient of the second values and
trigger the passenger protection device as a function of the determined frequency.

2. The device as recited in claim 1, wherein the analyzer circuit determines the frequency continuously.

3. The device as recited in claim 1, wherein:
the accident sensor system includes a plurality of accident sensors and generates a plurality of first signals; and
the frequency is determined by the analyzer circuit as a function of weighting and averaging the first values and the second values of the respective second signals and third signals derived and integrated for the respective first signals.

4. The device as recited in claim 3, wherein the analyzer circuit is adapted to perform the weighting as a function of the second values of the third signals.

5. The device as recited in claim 1, wherein the accident sensor system has an inertial sensor system.

6. The device as recited in claim 5, wherein the accident sensor system includes an acceleration sensor system.

7. The device as recited in claim 1, wherein the accident sensor system includes a knock sensor system.

8. A method for triggering a passenger protection device of a vehicle, the method comprising:
obtaining, by a processing circuit, a first signal from an accident sensor system that generates the first signal in response to a single impact event in which an object impacts the vehicle;
deriving, by the processing circuit, a second signal from the first signal;
integrating, by the processing circuit, the second signal to obtain a third signal;
determining, by the processing circuit, a first value, which characterizes a combination of values of the second signal over an entirety of a period during which the second signal lasts, by a summation of particular differences between successive values of the second signal;
determining, by the processing circuit, a second value, which characterizes a combination of values of the third signal over an entirety of a period during which the third signal lasts, by a summation of particular differences between successive values of the third signal;
determining, by the processing circuit, a frequency of the second signal by forming a quotient of the second values and
triggering, by the processing circuit, the passenger protection device as a function of the determined frequency.

9. The method as recited in claim 8, wherein the frequency is determined continuously.

10. The method as recited in claim 8, wherein accident sensor includes a plurality of accident sensors, the first signal includes a plurality of first signals generated by respective ones of the plurality of accident sensors, and the frequency is determined as a function of weighting and averaging the first values and second values of the respective second signals and third signals derived and integrated for the respective first signals.

11. The method as recited in claim 10, wherein the weighting is performed as a function of the second values of the third signals.

12. The method as recited in claim 8, wherein the first signal is an acceleration signal.

13. The method as recited in claim 8, wherein the second signal is at least one of: an integrated first signal and a filtered first signal.

14. The method as recited in claim 8, wherein prior to the determination of the frequency, the first signal is modified by signal processing.

15. The method as recited in claim 8, wherein the determined frequency represents an oscillation frequency of vibration that occurs with the single impact event.

16. The device as recited in claim 1, wherein the first signal is an acceleration signal.

17. The device as recited in claim 1, wherein the second signal is at least one of: an integrated first signal and a filtered first signal.

18. The device as recited in claim 1, wherein, prior to the determination of the frequency, the analyzer circuit modifies the first signal by signal processing.

19. The device as recited in claim 1, wherein the determined frequency represents an oscillation frequency of vibration that occurs with the single impact event.

20. A method for triggering a passenger protection device of a vehicle, the method comprising:
- obtaining, by a processing circuit, a first signal from an accident sensor system that generates the first signal in response to a single impact event in which an object impacts the vehicle;
- deriving, by the processing circuit, a second signal from the first signal;
- determining, by the processing circuit, a first value, which characterizes a combination of values of the first signal over an entirety of a period during which the first signal lasts, by a summation of particular differences between successive values of the first signal;
- determining, by the processing circuit, a second value, which characterizes a combination of values of the second signal over an entirety of a period during which the second signal lasts, by a summation of particular differences between successive values of the second signal;
- determining, by the processing circuit, an angular frequency of the second signal by forming a quotient of the and second values and
- triggering, by the processing circuit, the passenger protection device as a function of the determined frequency.

21. The method as recited in claim 20, wherein the values of the combination of values of the first signal and the values of the combination of values of the second signal include two of: values of the first signal over the entirety of the period during which the first signal lasts, values of an integrated version of the first signal over the entirety of the period during which the first signal lasts, and values of a filtered version of the first signal over the entirety of the period during which the first signal lasts.

22. The method as recited in claim 15, wherein the vibration is of an object not part of a structure of the vehicle.

23. A non-transitory computer-readable medium embodying a circuitry-executable program, which, when executed, causes the circuitry to perform a method, the method comprising:
- obtaining a signal that is generated in response to a single impact of an object on a vehicle;
- determining a first value, which characterizes a combination of values of a second signal derived from the first signal over an entirety of a period during which the second signal lasts, by an absolute summation of particular differences in successive values of the second signal;
- determining a second value, wherein the second value:
- characterizes a combination of values of the first signal over an entirety of a period during which the first signal lasts and is determined by a summation of particular differences in successive values of the first signal; or characterizes a combination of values of a third signal derived from the second signal over an entirety of a period during which the third signal lasts and is determined by a summation of particular differences in successive values of the third signal;
- determining a frequency of the second signal by forming a quotient of the first and second values; and
- triggering a passenger protection device of the vehicle as a function of the determined frequency.

24. The device as recited in claim 1, wherein the frequency is an angular frequency.

25. The device as recited in claim 1, wherein the frequency is defined by phase velocity divided by wavelength.

* * * * *